United States Patent
Takahashi et al.

(10) Patent No.: US 7,207,049 B2
(45) Date of Patent: Apr. 17, 2007

(54) DISK DRIVE DEVICE

(75) Inventors: Shoji Takahashi, Hannou (JP); Maki Wakita, Sayama (JP); Takuro Kohyama, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 512 days.

(21) Appl. No.: 10/484,966

(22) PCT Filed: Aug. 6, 2002

(86) PCT No.: PCT/JP02/08012

§ 371 (c)(1),
(2), (4) Date: Jan. 28, 2004

(87) PCT Pub. No.: WO03/017270

PCT Pub. Date: Feb. 27, 2003

(65) Prior Publication Data

US 2004/0199928 A1 Oct. 7, 2004

(30) Foreign Application Priority Data

Aug. 17, 2001 (JP) ............................. 2001-248132
Oct. 15, 2001 (JP) ............................. 2001-316738

(51) Int. Cl.
G11B 17/04 (2006.01)
(52) U.S. Cl. .................................. 720/603

(58) Field of Classification Search ................ 720/603, 720/613, 652, 653, 601
See application file for complete search history.

(56) References Cited

U.S. PATENT DOCUMENTS 6,208,605 B1 3/2001 Akiba
6,910,218 B2 * 6/2005 Park et al. .................. 720/653

FOREIGN PATENT DOCUMENTS

| JP | 7-235111 | | 9/1995 |
| JP | 8-138296 | | 5/1996 |
| JP | 9-223347 | | 8/1997 |
| JP | 2002-50103 | * | 2/2002 |
| JP | 2003-187511 | * | 7/2003 |

* cited by examiner

Primary Examiner—Angel Castro
(74) Attorney, Agent, or Firm—Smith, Gambrell & Russell, LLP

(57) ABSTRACT

A disk drive device (1) comprises a body chassis (2) and a tray (3) movable relative to the body chassis (2). The body chassis (2) is provided with a stage (6) at one side thereof, which is higher than the central bottom face. On the other hand, a part of the disk protective portion (11) of the tray (3), which overlaps the stage (6), is cut out at its rear end (20a) in an arc shape. As a result, the disk protective portion (11) covers the whole area of a disk (14) and, at the same time, forms a large space between it and the front end (6a) of the stage (6).

13 Claims, 8 Drawing Sheets

B - B

DISK DRIVE DEVICE

BACKGROUND OF THE INVENTION

1. Field of the Invention

The present invention relates to a disk drive device for driving an information recording disk such as a compact disk (CD) or a digital video disk (DVD) loaded onto it and reading and writing information out of and into the disk.

2. Description of the Related Art

A disk drive device is built into a parent apparatus, such as a small computer. A first example of such conventional disk drive device will be below described below with reference to FIG. 8. This example is disclosed in the Japanese Patent Application Laid-Open No. 8-138296.

The disk drive device consists of a body chassis 102 to be fitted to a small computer and a tray 103 on which a disk is to be loaded. To the left side wall of the tray 103 is fitted a left slider 140, and near the right end of the under face of the tray 103 is fitted a right slider 141.

On the other hand, a left slider rail 150 is formed on the left side wall of the body chassis 102, and a right slider rail 151, on the right side wall of the same. By the mutual engagement of these sliders 140 and 141 and slider rails 150 and 151, the tray 103 is supported by the body chassis 102 to be movable in the Y–Y' direction.

A stage 106 protrudes horizontally outwards from the upper end of the right side wall of the body chassis 102. The top face of the stage 106 is positioned higher than the central bottom face of the body chassis 102.

The disk protective portion 111 of the tray 103 is in a rectangular shape large enough to cover the whole area of the under face of the disk. However, in a state in which the tray 103 is fully pulled out of the body chassis (in an unloaded position), there is a slight gap between the rear edge of the disk protective portion 11 (the edge on the body chassis side) and the front end of the body chassis 102 (the edge on the tray side). This gap is intended to prevent the disk, when it is unloaded from or loaded onto the tray 103, from hitting the body chassis 102.

In a state in which the tray 103 is fully pressed into the body chassis 102 (in a loaded position), the portion of the disk protective portion 111 protruding rightwards from the right slider 141 comes above the stage 106.

In order to minimize the height of this disk drive device illustrated in FIG. 8, it is required to minimize the gap, if any, between the top face of the stage 106 of the body chassis 102 and the under face of the disk protective portion 111 of the tray 103.

Then, when the tray 103 in the unloaded position is pressed into the body chassis 102, the rear end of the disk protective portion 111 hits against the front end of the stage 106 of the body chassis 102, making it impossible to press the tray 103 farther in. This occurs because, when the tray 103 begins to be shifted from the unloaded position into the body chassis 102, the sliders 140 and 141 and the slider rails 150 and 151 are not yet engaged with each other for a sufficient length, and the tray 103 is made liable to oscillate vertically during its shifting.

On the other hand, if it is so arranged that part of the disk protective portion 111 overlaps part of the stage 106 even when the tray 103 is in the unloaded position, the shifting of the tray 103 is not obstructed by the stage 106 of the body chassis 102 when the tray 103 in the unloaded position is pressed into the body chassis 102. In this case, however, there is a fear that the disk may be allowed to hit against the body chassis 102 when the disk is unloaded from, or loaded onto, the tray 103.

Next will be described a second example of conventional disk drive device with reference to FIG. 9. This example is disclosed in the Japanese Patent Application Laid-Open No. 9-223347.

The disk drive device consists of a body chassis 202 fitted to a small computer and a rail tray 203 on which a disk is to be loaded. The tray 203 is supported by the body chassis 202 to be movable in the A-B direction.

To the left and right side walls of the body chassis 202 are fitted fixed side rails 207, and to the left and right side walls of the tray 203 are fitted movable side rails 206. Between these movable side rails 206 and fixed side rails 207 intervene intermediate rails 208.

From the top end of the right side wall the body chassis 202 protrudes a stage 216 outwards horizontally. The top face of the stage 216 is positioned higher than the central bottom face of the body chassis 202.

The disk protective portion 211 of the tray 203 is provided only in the area between the left and right movable side rails 206, and the outer (right) side of the right rail 206 is cut off. This absence of the disk protective portion 211 outside the right rail 206 eliminates the overlapping of the stage 216 and the disk protective portion 211 when the tray 203 is pressed into the body chassis 202, and results in the advantage that the disk drive device can be reduced in height.

However, the portion of the disk loaded on the tray 203 outside the right rail 206 (i.e. the portion overlapping the stage 216) is unprotected and exposed. Moreover, as the width of the disk protective portion 211 is smaller than the full diameter of the disk, the strength of the tray 203 is weakened.

SUMMARY OF THE INVENTION

An object of the present invention is to provide a low profile disk drive device which allows a tray to be smoothly inserted into a body chassis.

In order to achieve the object stated above, a disk drive device according to a first aspect of the invention has a body chassis and a tray slidable between a first state in which it is drawn out of the body chassis and a second state in which it is pressed into the body chassis. Further a bottom plate constituting the body chassis has a stage, at one side thereof, formed higher than the central portion thereof, and the tray has a protruding protective portion in its position vertically overlapping the stage when pressed into the body chassis. The end of the protruding protective portion on the body chassis side is partly cut so that, when the tray is drawn out of the body chassis, a gap be formed between the tray and the end of the body chassis on the tray side.

A disk drive device according to a second aspect of the invention has a body chassis and a tray made slidable by a guide rail mechanism between a first state in which it is drawn out of the body chassis and a second state in which it is pressed into the body chassis. Further, the tray is provided with a tray base and a disk protective portion, and the guide rail mechanism is provided with chassis side guide rails arranged on the left and right sides of the body chassis and tray side guide rails arranged on the left and right sides of the tray base. The disk protective portion comprises a main protective portion corresponding to the area between the left and right tray side guide rails and a protruding protective portion protruding from the right tray side guide rail farther outwards. These main protective portion and protruding protective portion cover at least the whole area of the under face of the disk loaded on disk. The end of the protruding protective portion on the body chassis side is partly cut out so that, when the tray is drawn out of the body chassis, a gap be formed between the tray and the end of the body chassis on the tray side.

An end of the protruding protective portion is either cut out along the outer circle of the disk loaded on the tray or partly cut out in an inclined or curved shape. When the tray is drawn out of the body chassis, a gap is formed between the end of the protruding protective portion and the end of the body chassis on the tray side.

In the disk drive device according to the invention, the whole under face of the disk is protected by the disk protective portion and, at the same time, the tray can be easily drawn out of or pressed into the body chassis. Especially when the tray is to be pressed into the body chassis, the rear end of the disk protective portion provided on the tray side is structurally prevented from hitting against the front end of the stage of the body chassis, thereby enabling the disk protective portion to smoothly ride on the stage of the body chassis.

DETAILED DESCRIPTION OF THE PREFERRED EMBODIMENTS

Figure 1:
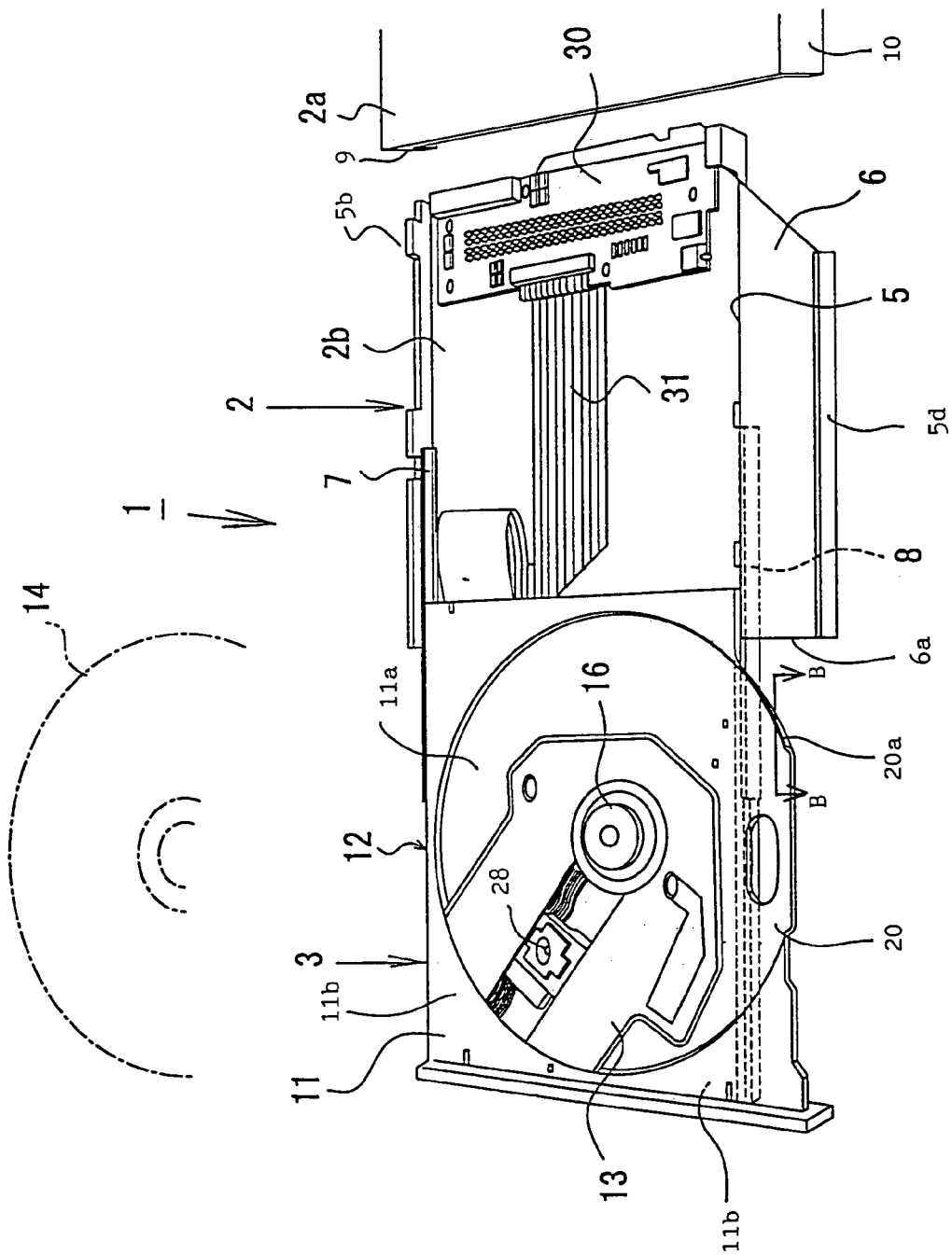
FIG. 1 shows a perspective view of a disk drive device, which is a preferred embodiment of the present invention.

A disk drive device 1 is provided with a body chassis 2 and a tray 3 as shown in FIG. 1. The body chassis 2, produced by pressing a steel sheet, consists of a top plate 2a and a bottom plate 2b.

Figure 2:
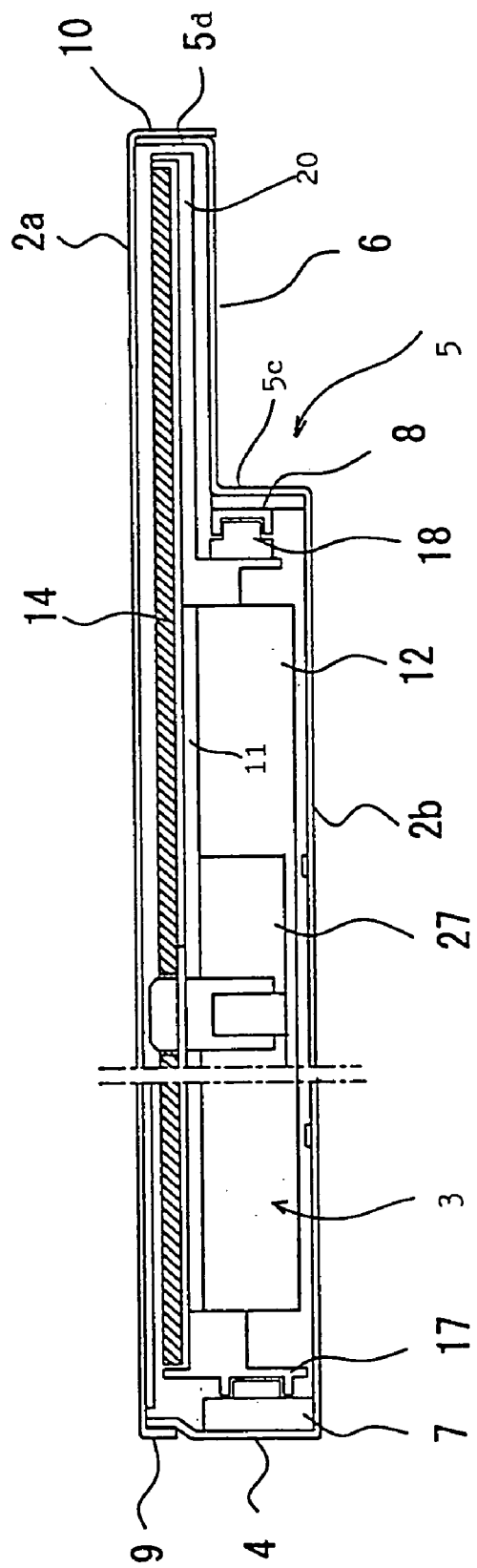
FIG. 2 shows a cross-sectional view of the disk drive device of FIG. 1.

On the left and right sides of the top plate 2a are formed side walls 9 and 10 and, as shown in the sectional view of FIG. 2, side walls 4 and 5 are also formed on the left and right sides of the bottom plate 2b. The right side wall 5 consists of a first right side wall 5c rising from an end of the bottom face of the bottom plate 5a, a stage 6 extending horizontally outwards (rightwards) from the upper end of a first right side wall 5c, and a second right side wall 5d rising from the tip of the stage 6.

When the top plate 2a is placed over the bottom plate 2b, as shown in FIG. 2, the left side wall 9 of the top plate 2a engages with the left side wall 4 of the bottom plate 2b, and the right side wall 10 of the top plate 2a engages with the second right side wall 5d of the bottom plate 2b.

To the inner side faces of the left side wall 4 and the first right side wall 5c of the bottom plate 2b are fitted guide rails (hereinafter referred to as chassis side guide rails) 7 and 8.

The tray 3 consists of a synthetic resin-made disk protective portion 11 and a synthetic resin-made tray base 12 supporting the disk protective portion 11.

The disk protective portion 11 consists of an underside protective portion 11a for protecting the immediate underneath of a disk 14 and a peripheral protective portion 11b protecting the outer circumference of the disk 14. The underside protective portion 11a has a circular area slightly greater in diameter than the disk 14. A level difference is provided between the peripheral protective portion 11b and the underside protective portion 11a and, when the disk 14 is placed over the underside protective portion 11a, the top face of the peripheral protective portion 11b comes to a higher position than the top face of the disk 14.

A metallic thread chassis 13 is built into the tray base 12. The thread chassis 13 is provided with a turntable 16 for holding the disk 14, a motor (not shown) for rotationally driving the turntable 16, ahead shifting mechanism (not shown) for shifting a head 28 and so forth. The power and control signals for driving these motor and shifting mechanism are transmitted by a flexible flat cable 31 connected to the main circuit board 30 on the body chassis 2 side.

As a slight gap is formed between the disk 14 and the underside protective portion 11b when the disk 14 is loaded on the turntable 16, the disk 14, when it turns, does not come into contact with the underside protective portion 11b.

Figure 3:
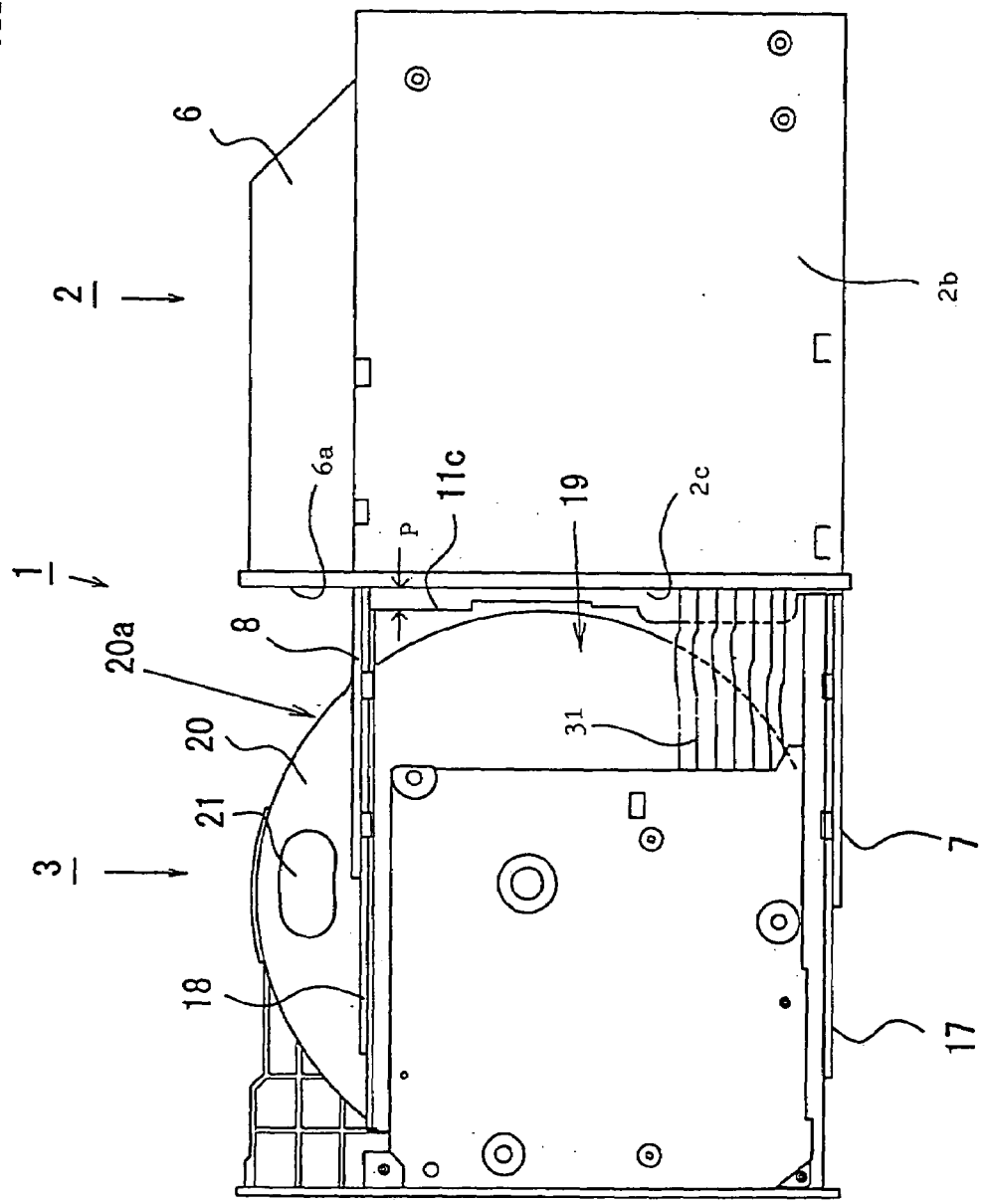
FIG. 3 shows the disk drive device of FIG. 1 viewed from underneath, wherein the tray is fully drawn out of the body chassis and in a state to permit loading or unloading a disk onto or from it (in an unloaded position)

When the tray 3 is fully drawn out of the body chassis 2 to position the disk 14 at a position (hereinafter referred to as unloaded position) where it can be unloaded from the turntable 16, there is formed a certain gap p between the rear end 11c of the disk protective portion 11 (the end on side of the body chassis 2) and the front end 2c of the body chassis 2 opposite thereto as shown in the underside view of FIG. 3. This arrangement is intended to prevent the disk 14 from hitting any end of the body chassis 2 when the disk 14 is loaded onto the tray 3 in the unloaded position or to unload the disk 14 from the tray 3.

On the left and right sides of the tray base 12 are arranged guide rails (hereinafter referred to as tray side guide rails) 17 and 18 as shown in FIG. 2. The left guide rail 17 engages with the left chassis side guide rail 7 via an intermediate guide rail, and the right guide rail 18 engages with the right chassis side guide rail 8 via another intermediate guide rail. The structure of these intermediate guide rails will be described afterwards.

With these chassis side guide rails 7 and 8 and tray side guide rails 17 and 18, the tray 3 can be slid in the direction of pressing it towards the chassis 2 or drawing it out of the chassis 2.

The spacing between the tray side guide rails 17 and 18 fitted on the left and right sides of the tray base 12 is smaller than the diameter of the disk 14. Therefore, when the disk 14 is so placed over the disk protective portion 11 that the tangent of its circle substantially coincide with the left guide rail 17, part of the disk 14 protrudes from the right guide rail 18 farther outwards (rightwards) as shown in FIG. 3.

If the disk protective portion 11 were provided only between the left and right guide rails 17 and 18, part of the underside of the disk 14 could not be protected by the disk protective portion 11.

In view of the above, according to the invention, the disk protective portion 11 is extended beyond the space between the left and right tray side guide rails 17 and 18 farther outwards (rightwards) in order to protect the whole under face of the disk 14. As a result, the disk protective portion 11 consists of a portion corresponding to the area between the left and right tray side guide rails 17 and 18 (a main protective portion 19) and an extend portion (a protruding protective portion 20) protruding from the right tray side guide rail 18 farther outwards (rightwards).

Out of the disk protective portion 11, the main protective portion 19 has a substantially rectangular shape. On the other hand, the protruding protective portion 20 has a rectangular shape with its rear part (the part closer to the body chassis 2) cut out substantially along the outer circle of the disk 14 loaded on the tray 3 as shown in FIG. 3. The cut-out edge of the protruding protective portion 20 is denoted in FIG. 3 by reference sign 20a.

This rear edge 20a of the protruding protective portion has an arc shape substantially coinciding with the outer circumference of the disk 14 loaded on the turntable 16. Therefore, when the tray 3 is in the unloaded position (FIG. 3), the rear edge 20a of the protruding protective portion 20 is ahead of the front end of the stage 6 farther than the distance p (the gap between the rear end 11c of the main protective portion 19 of the disk protective portion 11 and the front end 2c of the body chassis 2 opposite thereto), with the result that, when the tray 3 is in the unloaded position, a large space is formed between the edge 20a of the protruding protective portion 20 and the front end 2c of the body chassis 2.

Figure 4:
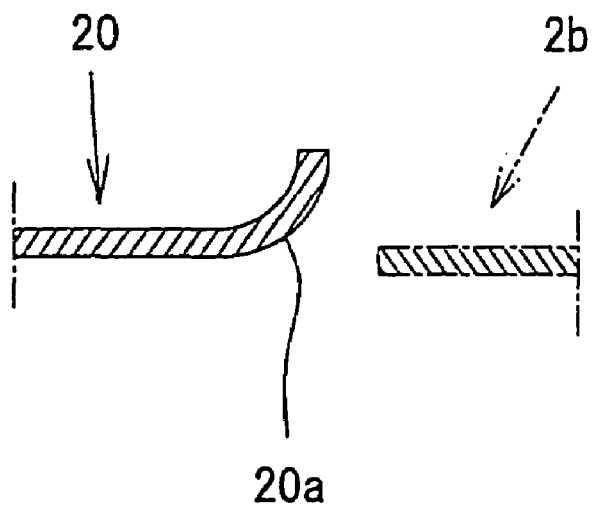
FIG. 4 shows a B-B section of FIG. 1.

Of the protruding protective portion 20 of the disk protective portion 11, apart thereof constitutes the underside protective portion 11a to protect the immediate underside of the disk 14, and the rest makes up the peripheral protective portion 11b to protect the outer circumference of the disk 14. Incidentally, since the part of the protruding protective portion 20 immediately inside the rear edge 20a constitutes the underside protective portion 11a, its rear edge 20a is provided with a side wall which gently curves upwards as shown in FIG. 4 and opposes an end face of the disk 14. The height of this side wall provided on the rear edge 20a is substantially equal to the level difference between the underside protective portion 11a of the disk protective portion 11 and the peripheral protective portion 11b.

Reference numeral 21 denotes a hole to put a finger through, when a minidisk is mounted on the turntable 16, to hook the finger on the outer circumference of the minidisk to load it onto or unload it from the turntable 16.

In the state wherein the tray 3 is fully pressed into the body chassis 2 (the loaded position), the protruding protective portion 20 of the disk protective portion 11 is positioned above the stage 6 of the body chassis 2 as shown in FIG. 2.

In order to minimize the height of the disk drive device 1, it is required to minimize the gap, if any, between the top face of the stage 6 of the body chassis 2 and the under face of the disk protective portion 11 (the protruding protective portion 20) of the tray 3. Therefore, care should be taken, when the tray 3 in the unloaded position is pressed into the body chassis 2, not to let the rear edge 20a of the protruding protective portion 20 in the disk protective portion 11 of the tray 3 hit against the front edge 6a of the stage 6 of the body chassis 2.

Incidentally, the disk drive device 1 according to the invention has the following advantages, since (1) the rear edge 20a of the protruding protective portion 20 extends obliquely forward and (2) a large space is formed between the rear edge 20a of the protruding protective portion 20 and the front edge 2c of the body chassis 2 as described above.

(1) When the protruding protective portion 20 approaches the stage 6 of the body chassis 2, as the rear edge 20 extends obliquely forward in an arc shape, the rear edge 20a in its whole does not become coincident with the front end 6a of the stage 6 of the body chassis 2 at once. The rear edge 20a gradually shifts backwards beyond the front end 6a of the stage 6 from its backward region towards the forward region. Therefore, the protruding protective portion 20 in the disk protective portion 11 can be smoothly superposed over the stage 6 of the body chassis.

(2) Unless the tray 3 in the unloaded position is shifted towards the body chassis 2 for a certain distance, the rear edge 20a of the protruding protective portion 20 does not reach the front end 6a of the stage 6 of the body chassis 2. In other words, by the time a part of the rear edge 20a of the protruding protective portion 20 begins to reach the front end 6a of the stage 6 of the body chassis 2, already the chassis side guide rails 7 and 8 and the tray side guide rails 17 and 18 are engaged with each other for some length. Therefore, there is no possibility for the protruding protective portion 20 in transit to oscillate to allow its rear edge 20a to hit against the front end 6a of the stage 6 of the body chassis 2.

The shape of this rear edge 20a of the protruding protective portion 20 need not be an exact arc, but may be an inclined straight line or a curve close to an arc.

Next will described in detail the engagement between the tray side guide rails 17 and 18 and the chassis side guide rails 7 and 8.

Figure 5:
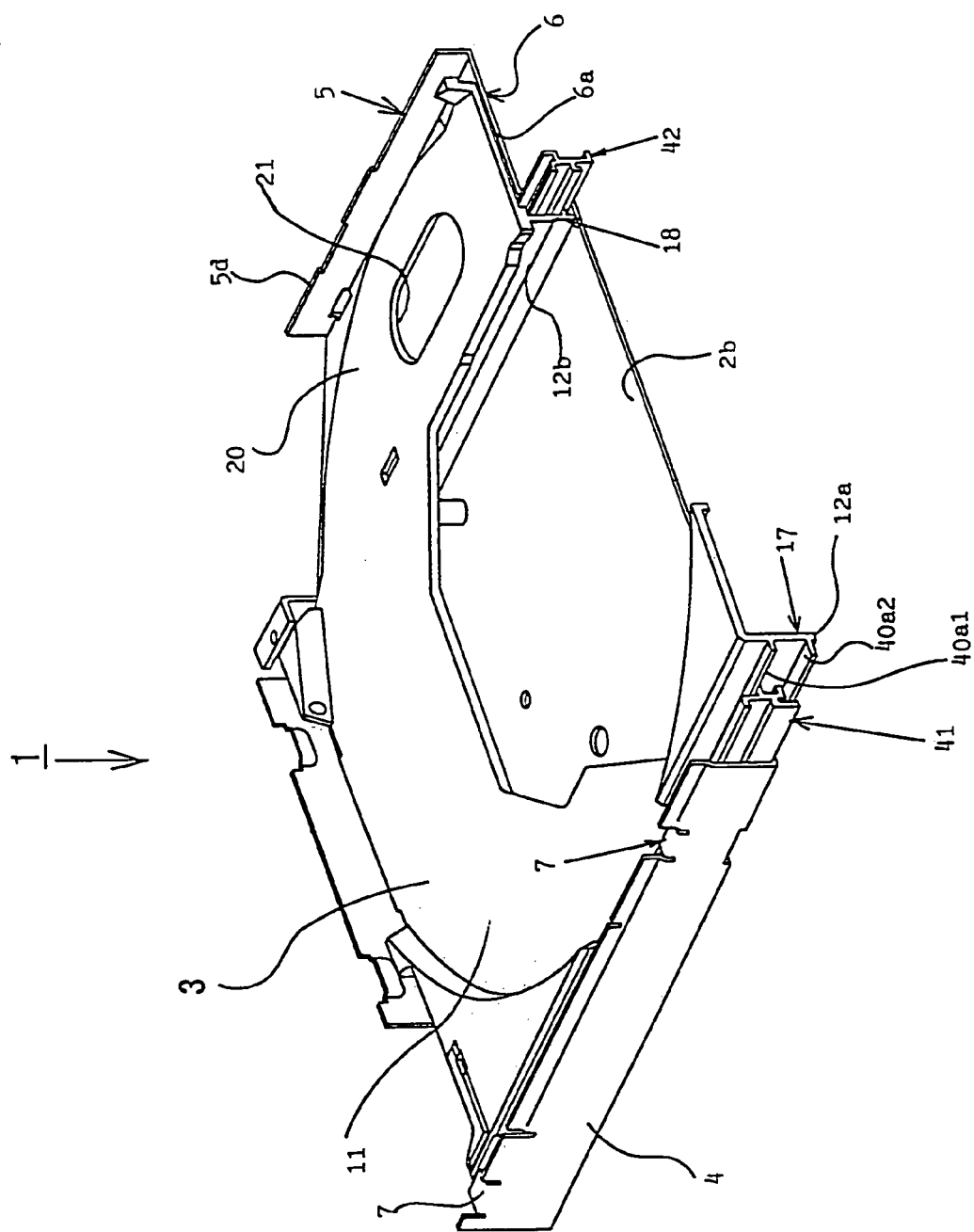
FIG. 5 shows the disk drive device of FIG. 1 in a state wherein the tray is pressed in over the body chassis (in a loaded position)

FIG. 5 shows a state wherein the tray 3 is pressed in over the body chassis 2 via the tray side guide rails 17 and 18 and the chassis side guide rails 7 and 8 (the loaded position).

Underneath the stage 6 in the bottom plate 2b of the body chassis 2 is formed a space, wherein components of the computer into which the disk drive device 1 is to be incorporated are arranged.

By cutting the upper edges of the left side wall 4 of the bottom plate 2b (FIG. 6) and the first right side wall 5c (FIG. 7) at several (e.g. three) positions, and then bending the upper edges inwards, chassis side guide rails 7 and 8 are formed.

In the left and right wall faces 12a and 12b of the tr ay base 12 of the tray 3, protruding strips 40a1, 40a2, and 40b1, 40b2 extending in the shifting direction of the tray are formed at the outside thereof. The left wall face 12a of the tray base 12 and the two protruding strips 40a1 and 40a2 formed thereon constitute the left tray side guide rail 17, and the right wall face 12b of the tray base 12 and the two protruding strips 40b1 and 40b2 formed thereon constitute the right tray side guide rail 18. These protruding strips 40a1, 40a2 and 40b2 have tips bent in an L shape.

The left tray side guide rail 17 engages with the left chassis side guide rail 7 via a left intermediate guide rail 41, and the right tray side guide rail 18 engages with the right chassis side guide rail 8 via a right intermediate guide rail 42. Both of these left and right intermediate guide rails 41 and 42 are extrusion-molded hard plastic products having a certain sectional shape.

Figure 6:
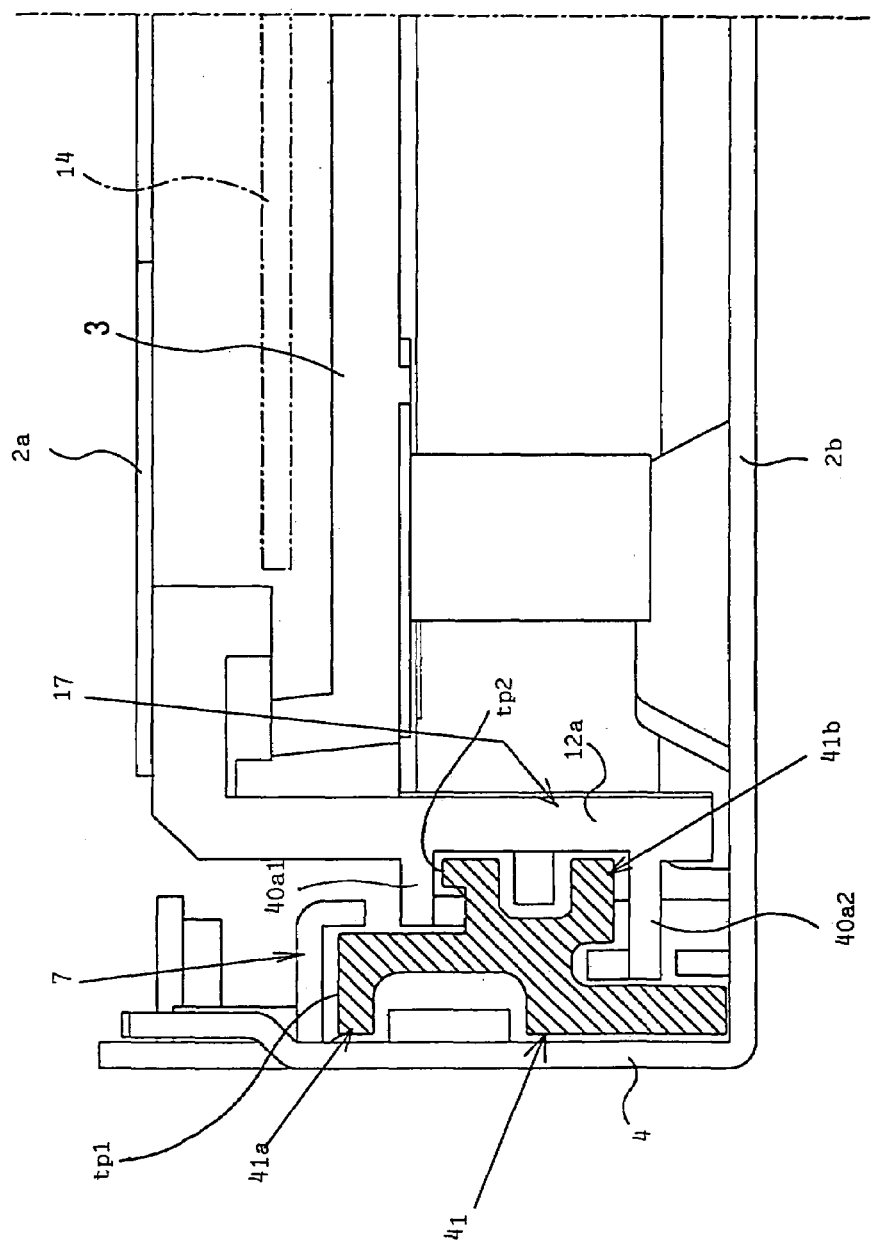
FIG. 6 shows a section of a left side one, out of the left and right guide mechanisms which enable the tray shown in FIG. 5 to be drawn out of or pressed into the body chassis.

The left intermediate guide rail 41, as shown in FIG. 6, has on its outside a first engaging portion 41a to engage with the left chassis side guide rail 7 and on its inside a second engaging portion 41b to engaged with the protruding strips 40a1 and 40a2 constituting the left tray side guide rail 17.

Figure 7:
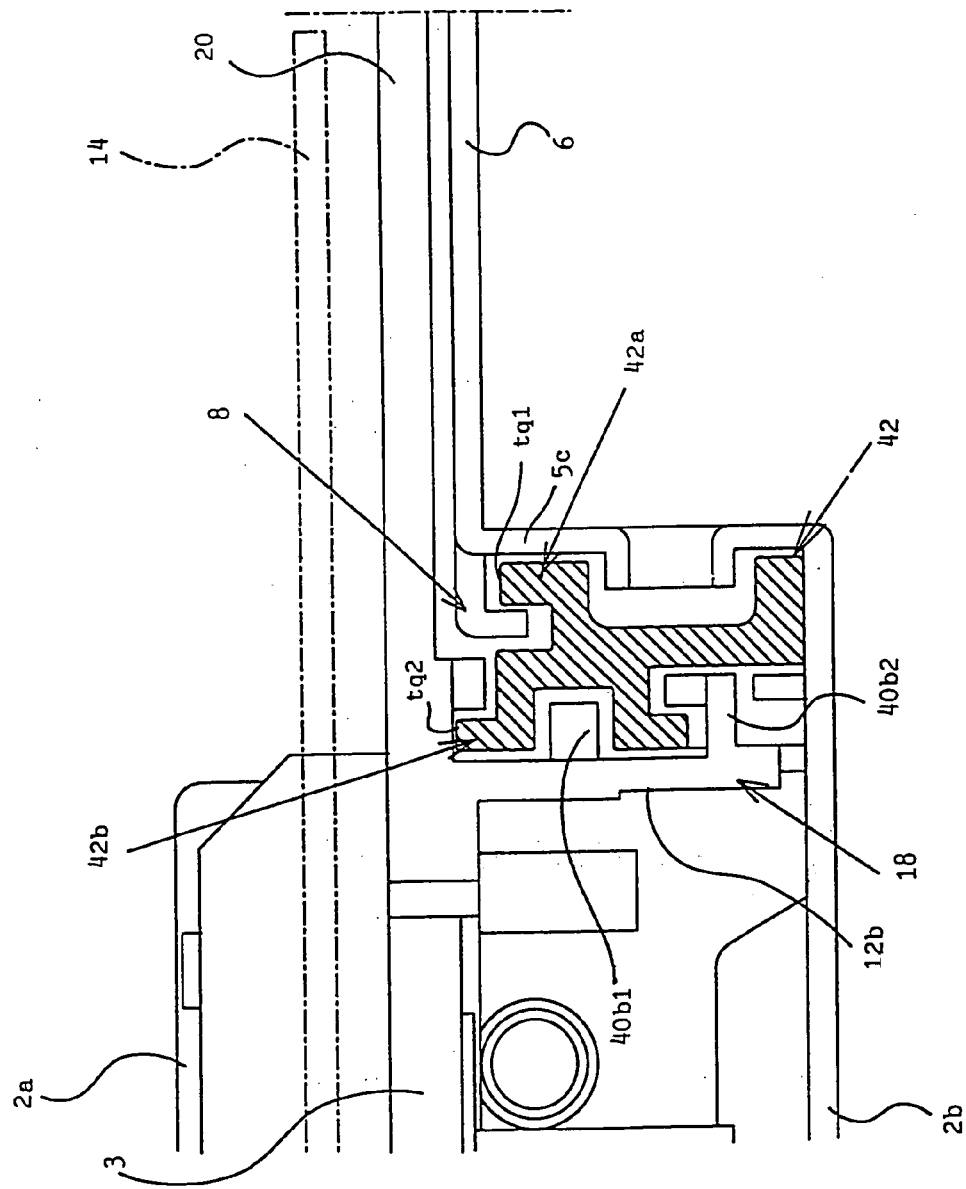
FIG. 7 shows a section of the right side guide mechanism.
Figure 8:
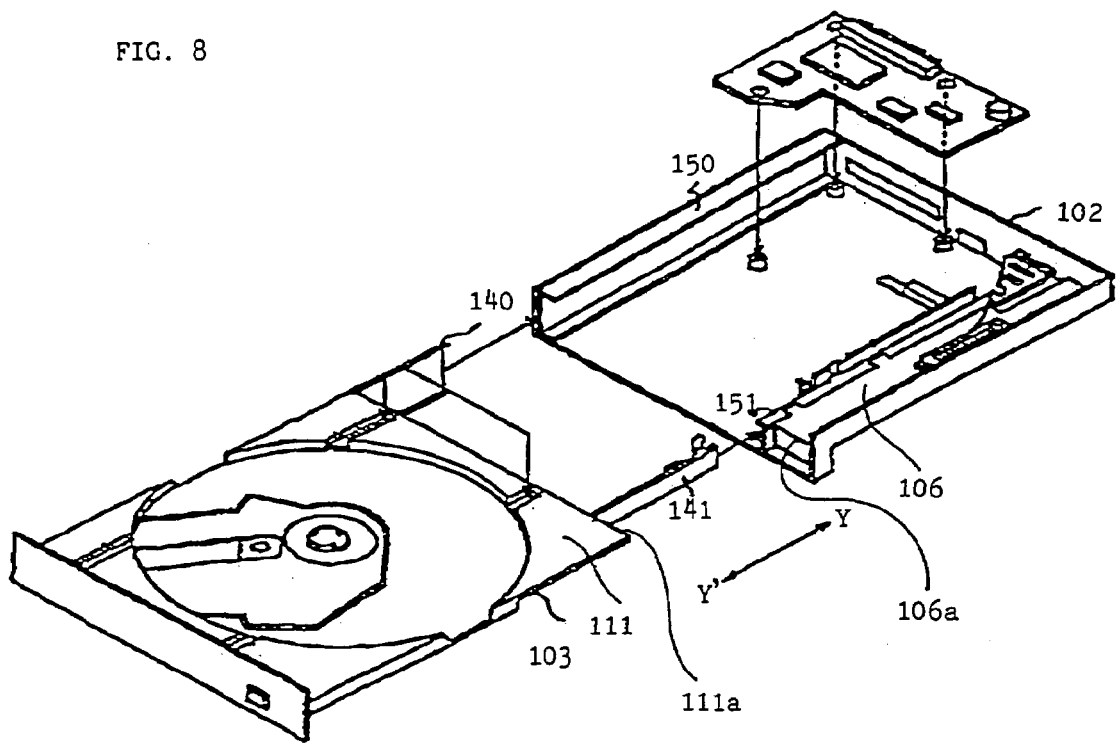
FIG. 8 shows a perspective view of a first example of conventional disk drive device.
Figure 9:
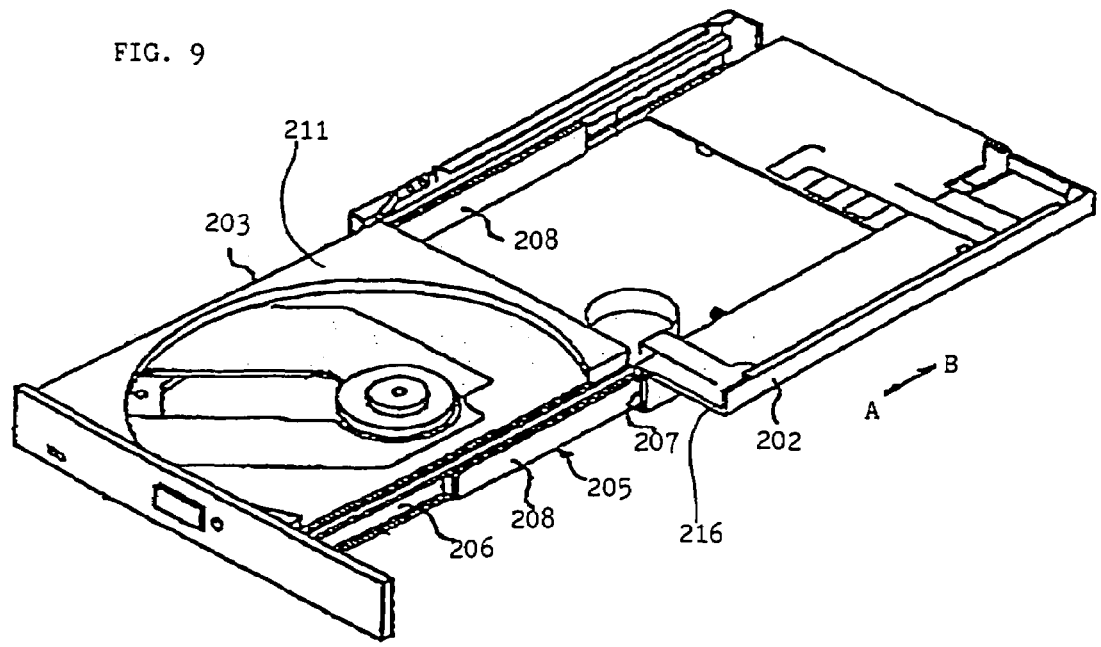
FIG. 9 shows a perspective view of a second example of conventional disk drive device.

On the other hand, the right intermediate guide rail 42, as shown in FIG. 7, has on its outside a first engaging portion 42a to engage with the right chassis side guide rail 8 and on its inside a second engaging portion 42b to engage with the protruding strips 40b1 and 40b2 constituting the tray side guide rail 18.

The engagement of the L-shaped tip portion of the left chassis side guide rail 7 and the protruding strips 40a1 and 40a2 of the tray side guide rail 17, whose tips are L-shaped, with the groove portion formed in the left intermediate guide rail 41 results in a structure which forbids the left chassis side guide rail 7 and the left tray side guide rail 17 from becoming disengaged laterally.

Also, the engagement of the L-shaped tip portion of the right chassis side guide rail 8 and the protruding strip 40b2 of the right tray side guide rail 18, whose tip is L-shaped, with the groove portion formed in the right intermediate guide rail 42 results in a structure which forbids the right chassis side guide rail 8 and the right tray side guide rail 18 from becoming disengaged laterally.

Moreover, as shown in FIG. 7, the top face tq1 of the first engaging portion 42a of the right intermediate guide rail 42 is formed in a position lower than the top face tq2 of the second engaging portion 42b. This enables the stage 6 of the body chassis 2 engaged with the first engaging portion 42a to be positioned sufficiently lower than the protruding protective portion 20 of the disk protective portion 11 placed above the second engaging portion 42b.

As a result, between the top face of the stage 6 of the body chassis 2 and the portion protruded farther outwards (rightwards) beyond the right tray side guide rail 18 (the protruding protective portion 20) to protect the whole area of the disk, an appropriate gap can be created without increasing the overall height of the disk drive device.

To add, the right tray side guide rail 18 has a recess to engage with the second engaging portion 42b of the right intermediate guide rail 42. The top portion of the recess is substantially equalized in height to the under face of (the protruding protective portion 20 of) the disk protective portion 11 of the tray 3. Thus, by bringing the top face tq2 of the second engaging portion 42b of the intermediate guide rail 42 as close as practicable to the under face of the disk protective portion 11 of the tray 3, the overall dimensions of the disk drive device 1 can be reduced.

On the other hand, as shown in FIG. 6, the top face tp1 of the first engaging portion 41a of the left intermediate guide rails 41 is formed in a position higher than the top face tp2 of the second engaging portion 41b. However, as is evident from FIG. 6, since there is a sufficient spacing between the top face tp1 of the first engaging portion 41a and the under face of the top plate 2a of the body chassis 2, there will be no particular problem even if the first engaging portion 41a of this left intermediate guide rail 41 is slightly increased in height.

What is claimed is:

1. A disk drive device having a body chassis and a tray slidable between a first state in which it is drawn out of the body chassis and a second state in which it is pressed into the body chassis, wherein:
    a bottom plate constituting said body chassis has a stage, at one side thereof, formed higher than the central portion thereof;
    said tray has a protruding protective portion at a position which allows the tray to overlaps vertically said stage when the tray is pressed into said body chassis; and
    the end of said protruding protective portion on the body chassis side is partly cut out so that, when said tray is drawn out of the body chassis, a gap is formed between the tray and the end of said body chassis on the tray side.

2. The disk drive device according to claim 1, wherein an end of said protruding protective portion is partly cut out in an inclined or curved shape and, when said tray is drawn out of the body chassis, a gap is formed between the end of said protruding protective portion and the end of the body chassis on the tray side.

3. The disk drive device according to claim 1, wherein an end of said protruding protective portion is partly cut out along the outer circle of a disk loaded on said tray.

4. A disk drive device having a body chassis and a tray made slidable by a guide rail mechanism between a first state in which it is drawn out of the body chassis and a second state in which it is pressed into the body chassis, wherein:
    said tray is provided with a tray base and a disk protective portion;
    said guide rail mechanism is provided with chassis side guide rails arranged on the left and right sides of the body chassis and tray side guide rails arranged on the left and right sides of the tray base;
    said disk protective portion comprises a main protective portion corresponding to the area between said left and right tray side guide rails and a protruding protective portion protruding from the right or left tray side guide rail farther outwards, and these main protective portion and protruding protective portion cover at least the whole area of the under face of the disk loaded on disk; and
    the end of said protruding protective portion on the body chassis side is partly cut out so that, when said tray is drawn out of the body chassis, a gap is formed between the tray and the end of said body chassis on the tray side.

5. The disk drive device according to claim 4, wherein said left and right chassis side guide rails and said left and right tray side guide rails are engaged with each other via left and right intermediate guide rails,
    each of said left and right intermediate guide rails has a first engaging portion to engage with one of said chassis side guide rails and a second engaging portion to engage with one of said tray side guide rails, and
    at least the one closer to said protruding protective portion out of said left and right intermediate guide rails has a top part of its first engaging portion positioned lower than a top part of its second engaging portion.

6. The disk drive device according to claim 4 or 5, wherein the guide rail mechanism, composed of the intermediate guide rail closer to said protruding protective portion, the chassis side guide rails and the tray side guide rails engaging the intermediate guide rail, is positioned underneath the disk loaded on the tray.

7. The disk drive device according to claim 4 or 5, wherein said chassis side guide rails are at least partly formed integrally with the body chassis.

8. The disk drive device according to any of claims 1 through 5, wherein said body chassis is formed of a thin metallic plate.

9. The disk drive device, according to claim 5, wherein the tray side guide rails constituting said guide rail mechanism have recesses to engage with second engaging portions constituting said intermediate guide rails, and the top parts of the recesses are substantially at the same height as the under face of the protruding protective portion of said tray.

10. The disk drive device according to any of claims 4, 5 and 9, wherein said tray, said protruding protective portion and said tray side guide rails are integrally molded plastic products.

11. The disk drive device according to any of claims 1 through 5 and 9, wherein said tray base and said disk protective portion are integrally molded plastic products.

12. The disk drive device, according to any of claims 1 through 5 and 9, wherein a finger hole is bored in said protruding protective portion.

13. The disk drive device, according to any of claims 1 through 5 and 9, wherein a rising wall of a prescribed height is formed at the end of the protruding protective portion of said disk protective portion on the body chassis side.

* * * * *